United States Patent [19]

Kruschik

[11] 4,221,234

[45] Sep. 9, 1980

[54] CLOSURE VALVES FOR USE IN COAXIAL FLOW SYSTEMS

[75] Inventor: Julius Kruschik, Gumpoldskirchen, Austria

[73] Assignee: Klinger AG, Zug, Switzerland

[21] Appl. No.: 888,154

[22] Filed: Mar. 17, 1978

[30] Foreign Application Priority Data

Mar. 21, 1977 [DE] Fed. Rep. of Germany ....... 2712307

[51] Int. Cl.² .................. F16K 1/12; F16K 31/122
[52] U.S. Cl. .................. 137/219; 137/334; 137/375; 137/594; F16K/49/00
[58] Field of Search ............... 137/219, 334, 375, 594, 137/595

[56] References Cited

U.S. PATENT DOCUMENTS

3,490,484  1/1970  Runton ............................. 137/219

FOREIGN PATENT DOCUMENTS

1242423  6/1967  Fed. Rep. of Germany ........... 137/219
2620905  11/1977  Fed. Rep. of Germany ........... 137/334

*Primary Examiner*—Gerald A. Michalsky
*Attorney, Agent, or Firm*—Haseltine, Lake & Waters

[57] ABSTRACT

A double-acting closure valve for use in a coaxial flow system consists of an inner pipe having an inner wall surface including surface portions which are profiled so as to provide a pair of inner valve seats spaced apart axially from one another, an inner body disposed coaxially within the inner pipe and having associated therewith a pair of inner valve closure members movable generally axially so as to abut the inner valve seats and an outer pipe coaxial with the inner pipe and having an inner wall surface including surface portions which are profiled so as to provide a pair of outer valve seats spaced apart axially from one another, an outer wall surface of the inner pipe also including surface portions each of which is profiled to enable one of a pair of outer valve closure members associated therewith to move generally axially so as to abut an outer valve seat. On abutment of the inner and outer valve closure members with respective inner and outer valve seats each of the coaxial passages defined by the inner and outer coaxial pipes is double closed since it is shut off at each of two positions spaced apart axially from one another. In a preferred embodiment a controlled fluid pressure may act upon the valve closure members in such a way that they are actuated in the event of fracture of the pipes or fluid control conduits.

16 Claims, 1 Drawing Figure

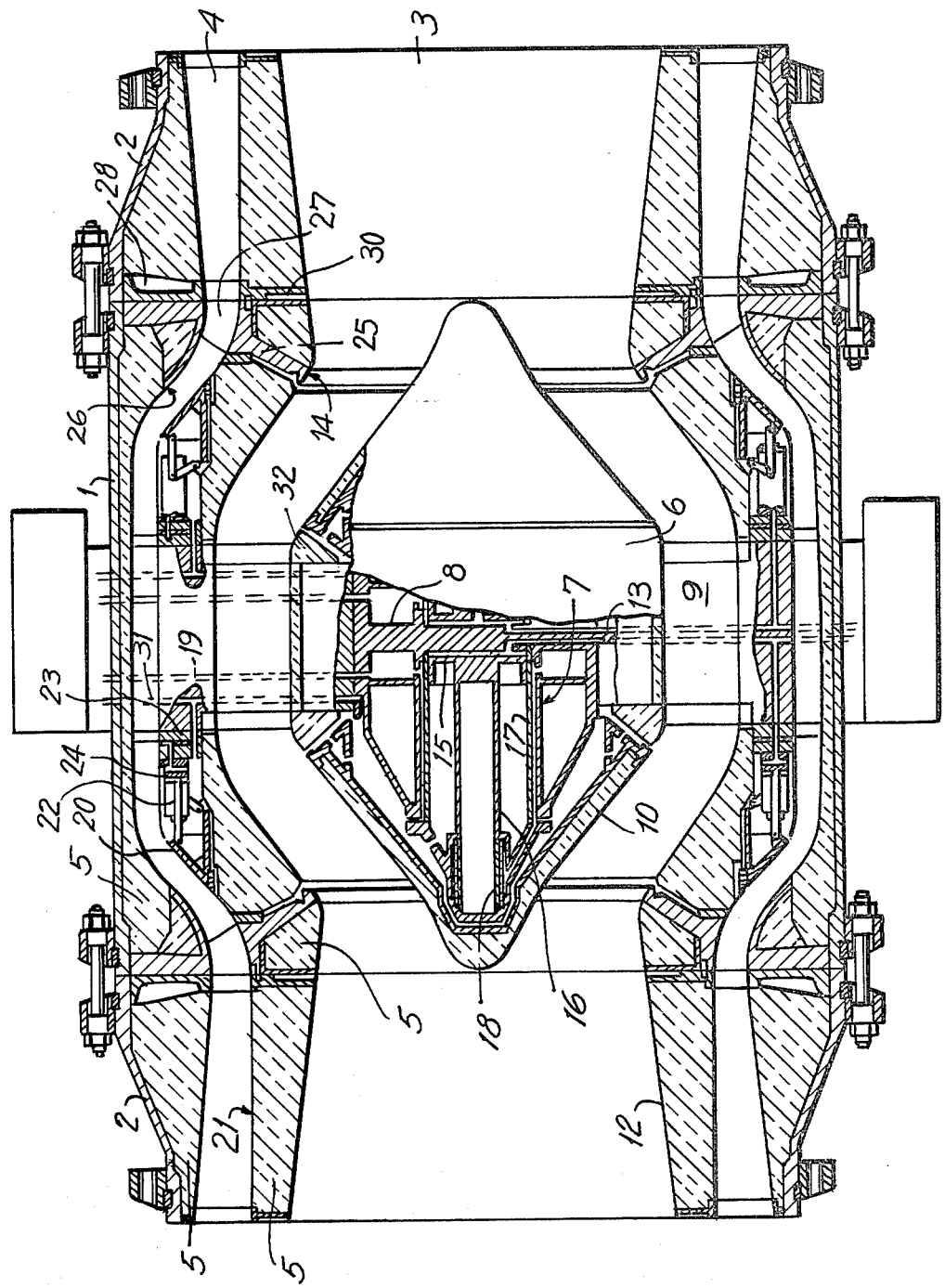

4,221,234

CLOSURE VALVES FOR USE IN COAXIAL FLOW SYSTEMS

FIELD OF THE INVENTION

The invention relates to a double acting closure valve for use in a coaxial flow system.

BACKGROUND OF THE INVENTION

Pipes of this kind are mainly used where hot gases have to be passed from a heating point to a working point and then returned in a closed circuit, as for example in a gas turbine, to the heating point. The hot gas is carried in the circular inner pipe and the cold gas, for example helium, in the circular annular outer pipe. A pipe construction of this kind has above all the advantage that it considerably reduces the loss of heat; in addition, only one supporting pipe structure is necessary.

For devices for closing coaxial pipes of this kind, only one proposal is known, and this is scarcely practicable since it does not provide a safety zone in the coaxial flow system which, in the event of failure of the device, can separate portions of flowing gas axially away from one another and thus prevent undesirable gas flow. Thus the known proposal does not provide a means by which the flow of hot gas can be rapidly shut off in the event of pipe fracture.

For most closed gas circuits it would be desirable to provide such a safety zone; a closure device of this kind is however indispensable when the heating of the gas takes place in a nuclear reactor, because then it must without fail be possible to shut off the flow of hot gas in both directions of flow, so that radioactive particles cannot pass out in the event of the fracture of a pipe or heat exchanger.

SUMMARY OF THE INVENTION

A first object of the invention is to provide double closure of each coaxial passage at spaced apart axial positions thereof, so that a safety zone extending between the axial positions is produced.

A second object of the invention is to provide an arrangement whereby there is a minimal disturbance of flow.

A third object of the invention is to provide a symmetrical arrangement of flow through the closure valve when the valve is in the open position.

A fourth object of the invention is to provide an outer valve closure member and seat therefor within respective pipe walls, thus removing these from the flow path when the closure valve is in the open condition.

A fifth object of the invention is to provide a closure valve which is readily assembled or disassembled by virtue of easy access to working parts.

A sixth object of a preferred embodiment of the invention is to provide a means for automatically effecting closure of the valve in the event of fracture of a pipe.

The invention is essentially characterised in that a double-acting closure valve for use in a coaxial flow system consists of an inner pipe having an inner wall surface including surface portions which are profiled so as to provide a pair of inner valve seats spaced apart axially from one another, an inner body disposed coaxially within the inner pipe and having associated therewith a pair of inner valve closure members movable generally axially so as to abut the inner valve seats and an outer pipe coaxial with the inner pipe and having an inner wall surface including surface portions which are profiled so as to provide a pair of outer valve seats spaced apart axially from one another, an outer wall surface of the inner pipe also including surface portions each of which is profiled to enable one of a pair of outer valve closure members associated therewith to move generally axially so as to abut a respective outer valve seat. On abutment of the inner and outer valve closure members with respective inner and outer valve seats each of the coaxial passages defined by the inner and outer coaxial pipes is double closed since it is shut off at each of two positions spaced apart axially from one another. In a preferred embodiment a controlled fluid pressure may act upon the valve closure members in such a way that they are actuated in the event of fracture of the pipes and fluid control conduits.

Generally, the inner body is located in an inner axial length of the inner passage and is disposed symmetrically with respect to the longitudinal axis of the inner pipe, the inner wall surface of the inner pipe being profiled so as to provide a portion of the inner passage with a greater radial extent to accommodate the inner body.

The inner body has a cylindrical central portion at axial ends of which are provided respective conical inner valve closure members each extending axially away from one another and tapering radially inwardly. The profiled portion of the inner wall surface likewise includes a central cylindrical portion of greatest diameter and, extending from axial ends thereof, respective radially inwardly tapering portions which provide respective inner valve seats in the wall for the inner valve closure members, which inner valve closure members move axially away from one another to abut the respective seats to effect closure.

The outer coaxial passage of annular cross-section is spaced apart from the inner passage by the wall of the inner pipe which preferably is constructed of or contains insulating material. This outer passage is defined at its radially outermost extent by the inner wall surface of the outer pipe and at its radially innermost extent by the outer wall surface of the inner pipe. Both of these wall surfaces include a surface portion which is profiled in a manner similar to that of the inner wall surface of the inner pipe as previously described and each said wall surface has a central cylindrical portion of greatest diameter with adjoining radially inwardly tapering wall surface portions extending from respective axial ends of the central cylindrical portion. Annular members which, when the outer valve is open define respective parts of the conically tapering portions of the outer wall surface of the inner pipe, define respective outer valve closure members which move axially away from one another to abut respective seats provided by complementary said tapering portions of the inner wall of the outer pipe.

In this way, a closure device is produced in which there is little disturbance of the flow system, the arrangement being axially symmetrical and thus favourable to flow.

Each one inner and outer valve seat of respective pairs thereof may lie in a common radial plane, which radial planes are axially spaced apart from one another to define a region therebetween which, when the closure valve is in the closed condition, serves as a safety region axially separating portions of gas from one another and thus reducing the possibility of gas flowing past the valve closure member in the event of failure of one of the valve closure members or fracture of a pipe.

This region can be further provided with a cooling medium to further improve safety and, as a still further precaution, the pressure of the coolant fluid may be so controllable as to exceed the pressure in the flow passages thus further biassing the valve closure members towards their closed condition.

It is advantageous, particularly from the point of view of causing minimal disturbance of flow, to locate the operating devices (which are preferably a pair of cylinders in which respective pistons are slidable) for the valve closure members of the inner valve in the interior of the inner body, a casing preferably being provided in the inner body therefor. It is also advantageous for the operating devices for the outer valve closure members to be located in a region within the wall of the inner pipe. Thus, with this arrangement, no mechanical operating devices are in contact with the fluid flowing through the valves when in the open condition.

The inner body may be carried by a plurality of strips fast therewith and with the outer pipe and extending generally radially between the said body and the outer pipe. The strips may further carry the inner-valve operating element and the outer valve operating elements, which outer valve operating elements are disposed in a housing within the wall of the inner pipe. In this way, the lowest possible coefficients of friction of the valve closure device are obtained. In addition, the carrying strips may be disposed on the inner and outer pipes with an inclination different from the radial, so that the thermal expansion of these carrier strips will not lead to straightening and disalignment of the parts carried thereby.

Usually, a plurality of outer-valve operating elements are provided, these being arranged in pairs distributed circumferentially within the housing in the inner pipe. They may be conveniently carried by a pair of annular rings each fast with a respective one of opposite longitudinal edges of each strip. The annular rings may each contain conduits through which control fluid for the operating elements may pass. In this manner, a direct flow of control fluid from the outer casing to the outer closure members can be achieved.

A very important advantage is achieved in respect of safety if in the arrangement described for the operating devices, inlet apertures lead into the casing in the inner body and into the housing containing operating devices thus allowing coolant fluid to surround these operating devices.

A stil further advantage is achieved if this coolant is maintained under elevated pressure in relation to the working medium, the fluid acting upon the internal surfaces of the respective valve closure members to thereby bias them towards the closed condition. Outlet apertures must then of course be provided to allow escape of the coolant fluid into the working medium, these being preferably formed by providing gaps between respective free ends of the said inner valve closure members and respective axially adjacent portions of the inner body and between respective free ends of the said outer valve closure members and respective axially adjacent portions of the outer wall surface of the inner pipe.

Assuming now that the operating devices are not self-locking (as indeed a piston slidable within a cylinder and operable by pressure acting on its external face is not self-locking), the effect is then achieved that closure can be automatically effected even after failure of the operating device. Since, in fact, elevated pressure prevails in the space around the operating devices in relation to the working medium, then in the event of the simultaneous fracture of a pipe and valve control conduits, this elevated pressure will force the closure members into the flow of the working medium. They will then be acted on by the working medium which is further accelerated in the event of a pipe fracture.

The valve closure members on the downstream side in each case are then pressed against associated seats and thus effect an automatic emergency closure in the manner of a non-return valve, there being no requirement for manual operation.

When the closure valve is in the closed position, and is operating normally, then the coolant fluids further assist in effecting closure, this being because it is at a higher pressure than the working medium and thus effects complete fluid-tight closure.

A most advantageous closure valve includes a pair of annular flanges each extending radially from the inner wall surface of the inner pipe towards the outer wall surface of the outer pipe, each said flange including a pair of concentric inner and outer ring portions interconnected by a plurality of webs extending radially across the outer passage, the said inner and outer rings carrying respective circumferential inner surface portions which are profiled axially and are in alignment with respective said inner wall surfaces of the inner and outer pipes to thereby constitute respective said profile portions thereof defining respective said inner and outer valve seats. The flanges are thus supported against the outer casing.

The double-acting closure valve conveniently consists of three axially aligned portions (an inner portion and two outer portions) each outer axially aligned portion being separated from the inner axially aligned portion by a respective said flange and the inner axially aligned portion being coaxial with the body, the said outer axially aligned portions and flanges being removable to enable access to the body. Thus, such a valve closure device is dismantlable by a simple operation, this being because the axially inner portion and the adjoining outer portion of the pipes can be separated from one another in a relatively simple manner. This is particularly so when the inner axially aligned portion is at least as long as the body when the closure valve is in the open condition. The inner axially aligned portion should not be substantially longer than the body.

A second pair of annular flanges each axially adjacent a respective previously mentioned flange may also be provided and this may carry or lie adjacent to a sealing element provided between adjacent axially aligned wall portions of the inner pipe, and are thus preventing transmission of heat therebetween.

BRIEF DESCRIPTION OF THE DRAWINGS

The invention will now be described in more detail with reference to the accompanying drawing which shows an axial section of a double-acting closure valve embodying the invention.

DESCRIPTION OF PREFERRED EMBODIMENTS

The closure valve embodying the invention for closing coaxial pipes consists of an outer pipe defined by a generally tubular outer wall which serves as an outer casing and consists of a central portion 1 and axially aligned outer portions 2, which outer casing is coaxial with an inner pipe defined by a generally tubular inner wall the inner surface of which wall defines an inner passage 3 of circular cross-section. An outer passage 4 of annular cross-section which extends coaxially with the inner passage 3 is defined at its radially innermost extent by the outer wall surface of the inner pipe and at its radially outermost extent by the inner wall surface of the outer casing 1,2. The inner passage 3 is intended to carry a hot medium to a utilisation point and the outer passage 4 to return cooled gaseous medium. The two passages 3,4 are separated from one another by a region between the inner and outer wall surfaces of the inner pipe and advantageously this is constructed from or contains insulating material 5. A portion of the inner passage 3 is defined at its radially outermost extent by a wall surface portion of the inner pipe which wall surface portion is of increased diameter. An inner body 6 is coaxially disposed within this portion of the passage 3. The inner body 6 has a central cylindrical portion from opposite axial ends of which extend conical inner valve closure members 10 which extend axially away from one another and taper radially inwardly. Likewise the portion of passage 3 of increased diameter has a central cylindrical portion coaxial with the inner body 6 and from axial ends of which extend radially inwardly tapering portions. This inner body 6 includes an inner casing 8 each axial end of which houses a respective cylinder 7 in which a fluid-pressure operated piston 15 is slidable and which is joined to the central portion 1 of the outer casing by a plurality of carrier strips 9 uniformly distributed around the periphery. The outer passage 4 (of annular cross-section) also has a portion of increased outer diameter which is defined at its radially outermost extent by an inner wall surface portion of the central portion 1 of the casing which is of increased internal diameter and at its radially innermost extent by an outer wall surface portion of the inner tubular pipe which outer wall surface portion is also of increased diameter. Each of these respective wall surface portions again includes a central cylindrical portion coaxial with that of the inner body from opposite axial ends of which extend respective radially inwardly tapering portions.

Both the inner passage 3 and the outer passage 4 are constructed symmetrically in relation to the radial plane extending through the inner casing 8, while in the entire axial extent of the casing 1,2, each of the pipe wall surfaces defining passages 3,4 have, starting from opposite axial ends of the casing, firstly a pair of diffusor-like frusto-conical portions each having a cross-section tapering axially inwardly towards the central portion 1 of the casing, the pipe wall surface portions within the central portion 1 including a pair of frusto-conical portions which taper radially outwardly as they extend axially inwardly toward a central cylindrical portion of largest diameter. This construction ensures a very advantageous flow around the inner body.

The pistons 15 in the cylinders 7 disposed in the inner casing 8 carry respective said conical inner valve closure members 10, which are constructed of heat-insulating material and which in the closed position cooperate with seats 14 provided in the wall 12 the inner surface of which defines the inner passage 3. The piston 15 in each cylinder 7 is operated by means of control fluid flowing in conduits 13 which extend through the carrier strips 9 and act on the outer surface of piston 15 which faces axially inwardly of the inner casing 8. Both the end of the piston rod near the connection to the inner valve closure member 10 and the piston head of the piston 15 are mounted aerostatically at their periphery. The cylinder 7 and piston 15 have respective bushes 17 and 18, which are made of porous synthetic carbon and the radially outer surface of which are acted upon by carrier gas supplied via conduits 19 extending through the carrier strips 9. The pressure of the medium which then flows into the interior of the cylinder 7 urges the piston 15 into its axially innermost condition and thus the closure member into the open position of the inner valve provided that the piston 15 is not urged in the opposite direction by fluid pressure in conduits 13.

The outer passage 4 of annular cross-section is also provided (symmetrically with respect to each carrier strip 9) with a pair of outer valve closure members 20 each of which forms a respective part of the outer wall 21 of the inner pipe which defines the radially innermost extent of the outer passage 4 and is disposed in that portion of the wall which tapers inwardly from the central cylindrical portion of greatest diameter. For the operation of the outer valve closure members there are provided twelve cylinders 22 each containing a respective fluid pressure operated piston 24, which cylinders 22 are arranged in six pairs each of a pair being disposed on one or two respective annular rings 23 fast with a respective one of opposite longitudinal edges of each carrier strip 9 and distributed uniformly around the periphery thereof. These work essentially on the same principle as the previously described pistons 15 contained in cylinders 7 housed in the casing 8 of the inner body 6. The outer surface of each piston head facing the carrier strips 9 is also operated by means of control fluid flowing in conduits 13 passing through the carrier strips; the pistons 24 are likewise held in the open position by the carrier gas for mounting the piston 24, the medium flowing into the interior of the cylinder 22 urging the piston to its axially innermost condition and thus the closure member into the open position of the outer valve provided that the piston 24 is not urged in the opposite direction by fluid pressure in conduit 13. The individual cylinders 22 distributed uniformly over the periphery are connected to one another by a synchronizing device, so that uniform forward movement of the outer valve closure members 20 is ensured.

Each axial end of the central portion 1 of the outer casing is in face to face relation with a connecting flange 25 which carries both of the inner and outer valve seats 14 and 26 respectively for the inner and outer valve closure members 10 and 20 respectively for closure of the respective inner and outer passages 3 and 4. Since it carries both of the seats 14 and 26 it must extend radially across the outer passage 4 and this is accomplished by the provision of webs 27 disposed in the outer passage 4. The axial end portions 2 are connected to respective opposite axial ends of the central portion 1 of the casing so as to retain therebetween both the connecting flange 25 and an adjacent flange 28, which likewise is provided with webs which extend radially across the outer passage 4. At the junction of each pair of these adjacent flanges 25,28 there is provided, in the region 30 between the inner and outer wall surfaces of the tubular inner pipe, damming devices which as far as possible prevent not only the flow of medium but also the transfer of heat between the inner and outer passages, these devices advantageously being in the form of metal seals of undulating cross-section, the regions of the individual undulation being sealed against one another when these seals are fitted, so that the flow of heat through convection from inside to outside is also prevented.

As already stated, in the open position of the double-acting closure valve, the pistons in the cylinder 7, 22 are acted upon by the carrier gas and the closure members 10,20 are thus held in the withdrawn position. The carrier gas in the cylinders is in communication with those surfaces of the closure members remote from the passages 3,4 and the latter surfaces are in communication with cooling gas conduits 31 which by way of the carrier strips 9 lead into the space between the respective cylinder 7 or 22 and closure member 10 or 20. By way of this conduit 31 the space inside the closure members is maintained at a constant pressure which is higher than the pressure of the working medium flowing through passages 3 and 4, while this cooling medium can flow out through the gap between the closure member 10 and the covering 32 of the inner casing 8 or inner wall 21 of the outer passage 4 and effect film cooling of the pipe walls.

In the event of the simultaneous fracture of the pipes and control conduits, the higher pressure prevailing downstream of the closure members 10,20 in comparison with the working medium moves the closure members slightly out of their position of rest in the direction of the seats. On the downstream side the closure members are then moved by the flowing medium against the seats associated with them and the necessary emergency closure is effected without being initiated by a control pulse from outside. In normal operation the closure valve can be closed by applying fluid pressure to the cylinders 7 and 22 from the inner casing 8 and from the annular rings 23 respectively, while in the closed condition the space between the two seats of the inner and outer pipes then receives cooling medium through the pipes 31, this cooling medium being passed, as already described, into the space between the closure member and operating cylinder and then forming the closing medium for that space.

The closure valve according to the invention therefore provides a double closure of two coaxial pipes, while the space between the two closure members of each of the inner and outer valve can be kept under closing medium; at the same time, emergency closure can be ensured without control from outside. The division of the outer casing into three parts facilitates assembly and servicing because the end portions 2 can be taken out of the pipe in a relatively simple manner, while the resulting gap permits access to the middle portion 1 of the casing for the servicing and dismantling of the closure members and cylinders.

What is claimed is:

1. An improved double-acting closure valve apparatus for use in a coaxial flow system, which closure valve comprises an inner pipe defined by a generally tubular wall having a longitudinal axis, an inner wall surface and an outer wall surface, an outer pipe defined by a generally tubular wall coaxial with the inner pipe and having an inner wall surface and an outer wall surface, an inner passage defined by the inner wall surface of the inner pipe an outer passage defined by each of the outer wall surface of the inner pipe and the inner wall surface of the outer pipe, said inner wall surface of the inner pipe being provided with a pair of axially spaced-apart inner profiled portions defining a pair of inner valve seats and said inner wall surface of the outer pipe being provided with a pair of axially spaced-apart outer profiled portions defining a pair of outer valve seats, an inner body located in the inner passage and disposed symmetrically with respect to the longitudinal axis of the inner pipe, a pair of inner valve closure members associated with the inner body for closure of the inner passage and a pair of outer valve closure members associated with the inner pipe for closure of the outer passage, said improvement comprising: providing said inner valve closure members to generally move axially away from one another and abut respective inner valve seats and said outer valve closure members each being capable of generally axial movement away from one another to abut respective said outer valve seats, and operating means capable of effecting said generally axial movement of the said inner and outer valve closure members to thereby effect the double-acting closure of each of the said inner and outer passages; said apparatus being defined by a pair of inner-valve operating elements, one for each respective inner valve closure member, disposed within a casing in the body and operating means capable of effecting generally axial movement of the outer valve closure members having at least one pair of outer-valve operating elements, at least one for each respective outer valve closure member, disposed within a housing provided between the said inner and outer wall surfaces of the inner generally tubular pipe; said casing and the said housing being in communication with a source of coolant fluid subjected to a pressure and controllable as to exceed the pressure of fluid in said inner and outer passages, each of said casing and housings being provided with fluid coolant apertures to allow escape of the said coolant fluid into said passages.

2. A double-acting closure valve according to claim 1 wherein said inner valve closure members are disposed at opposite axial end regions of the body and comprise radially inwardly tapering members extending axially away from one another and each of said inner valve seats is a complementary radially inwardly tapering portion of said inner wall surface of the inner pipe.

3. A double acting closure valve according to claim 2 wherein each said outer valve closure member is a radially inwardly tapering member which is movable relative to the outer pipe and which in the open position of the outer valve defines a respective radially inwardly tapering portion of the outer wall surface of the inner pipe and wherein each said outer valve seat is a complementary radially inwardly tapering portion of the said inner wall surface of the outer pipe.

4. A double acting closure valve according to claim 1 wherein each of said pair of inner-valve operating elements is a piston slidable within a cylinder and actuable by fluid pressure and each of said outer-valve operating elements is a piston slidable within a cylinder and actuable by fluid pressure.

5. A double acting closure valve according to claim 1 wherein the body is carried by a plurality of strips fast therewith and with the outer pipe and extending generally radially between the said body and the outer pipe.

6. A double acting closure valve according to claim 5 wherein the strips further carry said inner-valve operating elements and said outer valve-operating elements.

7. A double acting valve according to claim 6 wherein one of the said outer-valve operating elements of each pair thereof is secured to the said strip by one of a pair of respective annular rings each fast with a respective one of opposite longitudinal edges of each strip.

8. A double acting valve according to claim 7 including a plurality of said pairs of outer-valve operating elements distributed uniformly around the said annular ring.

9. A double acting valve according to claim 1 wherein the fluid coolant apertures are annular said apertures formed by providing gaps between respective free ends of the said inner valve closure members and respective axially adjacent portions of the inner body and between respective free ends of the said outer valve closure members and respective axially adjacent portions of the outer wall surface of the inner pipe.

10. A double acting closure valve according to claim 1 which includes a pair of annular flanges each extending radially from the inner wall surface of the inner pipe toward the outer wall surface of the outer pipe, each said flange including a pair of concentric inner and outer ring portions interconnected by a plurality of webs extending radially across the outer passage, the said inner and outer rings carrying respective circumferential inner surface portions which are profiled axially and are in alignment with respective said inner wall surfaces of the inner and outer pipes to thereby constitute respective said profiled portions thereof defining respective said inner and outer valve seats.

11. A double acting closure valve according to claim 10 wherein each of the said inner and outer pipes consists of three axially aligned portions comprising an inner portion and two outer portions, each outer said axially aligned portion being separated from the inner axially aligned portion by a respective said flange and the inner axially aligned portion being coaxial with the body, the said outer axially aligned portions and flanges being removable to enable access to the body portion.

12. A double acting closure valve according to claim 11 wherein the inner axially aligned portion is not substantially longer than the body.

13. A double acting closure valve according to claim 11 wherein the inner axially aligned portion is at least as long as the body when the closure valve is in the open condition.

14. A double acting closure valve according to claim 11 which further includes a second pair of annular flanges each axially adjacent a respective said first flange.

15. A double acting closure valve according to claim 14 which further includes sealing elements between the said inner and outer axially aligned portions to minimize heat transmission.

16. A double-acting closure valve according to claim 1 wherein an insulating material is provided between the inner and outer wall surfaces of the inner pipe.

* * * * *